Oct. 27, 1942.	L. C. KINNEY	2,300,228
NUT CONSTRUCTION
Filed Feb. 23, 1942
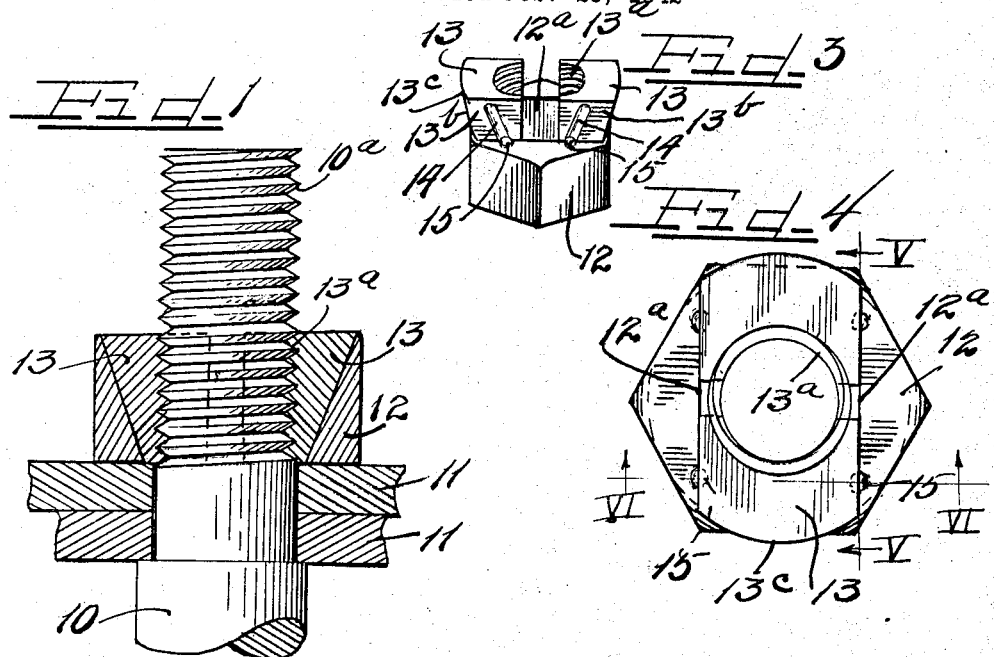
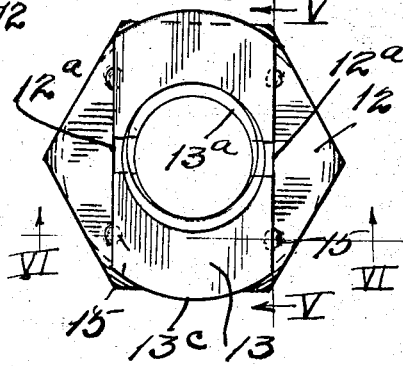
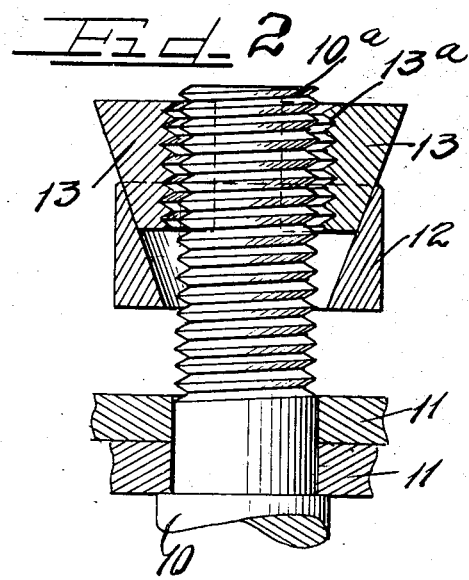
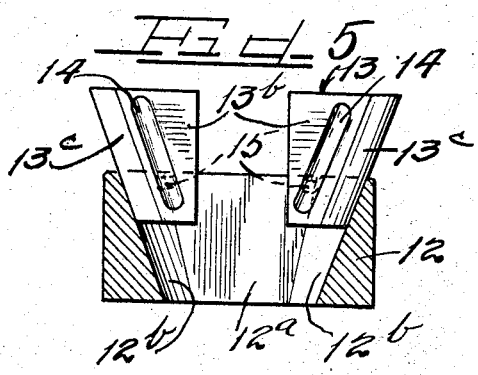
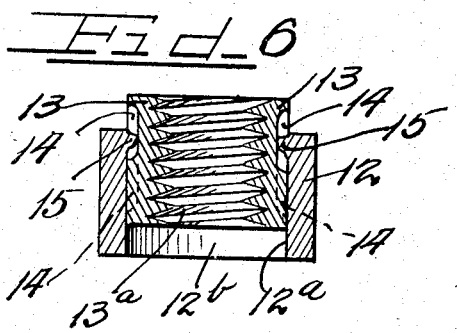
Inventor
Layton C. Kinney.
by Charles Hill Attys.

Patented Oct. 27, 1942

2,300,228

UNITED STATES PATENT OFFICE 2,300,228

NUT CONSTRUCTION

Layton C. Kinney, Chicago, Ill.

Application February 23, 1942, Serial No. 432,011

6 Claims. (Cl. 151—19)

My invention relates to an improved nut construction and is directed particularly to improvements in that type of nut which facilitates assembling operations.

One of the important objects of my invention is to provide an improved nut construction of the above character which, during the assembly or removal operation, is automatically and positively disengaged from the threads of a bolt sufficiently to afford sliding action of the nut over the threads of the bolt by virtue of movement thereof relative to the bolt.

Nut constructions of the general character here involved have been heretofore provided and in such constructions the assembly thereof upon a bolt is made possible by various moving parts which cooperate one with the other during the assembly operation. In the past, however, the advantages of quick assembly of the entire nut construction upon a bolt have been somewhat obviated by the irregular cooperating movements of the various parts and the failure thereof to properly disengage themselves from the threads of the bolt during the assembly or removal operations.

In the use of nut constructions of the above character, particularly those utilizing inserts having opposed threads for engaging each side of a bolt, it has been found that the inserts or bushings, though intended to spread to allow passage of the threads of the bolt thereby, do not always do so. Consequently the threads of the bolt lock in those of the inserts and the assembly or removal of the nut from the bolt is materially delayed because of the necessity of manipulating the inserts to manually spread them.

Still another important factor in producing constructions of the character here involved is the cost involved in manufacturing. As is well known, such constructions must be sold at relatively low prices. Consequently, the desired ends must be attained with a minimum of complicated structure and a minimum of manufacturing cost.

To the end that the above difficulties may be obviated, and the above ends be attained, there is provided herein a nut construction wherein relatively movable cooperating inserts coact with one another to facilitate ready assembly of the nut to a bolt, yet are securely maintained together in assembled relationship against becoming separated and are compelled to spread apart from one another and disengage from the threads of the bolt so that the entire construction may be slid thereover.

To the end that the above objects may be attained and in accordance with the general features of my invention, there is provided herein an improved nut construction embodying an outer casing or shell and bushing or insert members disposed in the body of the shell, having grooves provided therein for receiving upset portions of the shell body whereby the bushings are permanently retained within the shell but are cooperable therewith in such a manner that their movement relative to the shell is predetermined in a manner to further facilitate the assembly of the nut construction with a bolt.

Still another object of my invention is to provide a construction of the above character which may be manufactured with a minimum of expense, by forging or stamping, which is rugged and strong and which affords an efficient, tight connection with a bolt or work piece.

Other objects of my invention will become apparent from the following description and accompanying drawing, in which:

Figure 1 is a cross-sectional view showing the relationship of the various parts of my improved construction when assembled in its ultimate position with a bolt and a work piece;

Figure 2 is a longitudinal cross section showing the relative positions of the various parts as the nut is being assembled upon the bolt;

Figure 3 is a perspective view of the entire nut construction showing the bushing element in extended position;

Figure 4 is a top plan view of a nut embodying my invention;

Figure 5 is a cross-sectional view taken on the line V—V of Figure 4; and

Figure 6 is a cross-sectional view taken on the line VI—VI of Figure 4.

It is to be understood that the embodiment shown herein is for illustrative purposes and may be changed or modified without departing from the spirit and scope of the invention as set forth in the appended claims.

In the drawing:

A bolt 10 having threads 10a is shown as extending through coinciding apertures formed in a pair of plates 11 adapted to be held securely together.

A nut embodying my invention and adapted to be assembled upon the threaded portion of the bolt includes an outer casing portion 12 of the usual hexagonal form for receiving a wrench or the like, this casing being provided with an internal aperture having lateral vertical walls 12a and opposed tapered end walls 12b.

Within the aperture a pair of clamping members 13 are adapted to be seated, these members having inner faces 13a configurated and threaded to accurately fit and enmesh with the threads of the portion 10a of the bolt. Externally, the members 13 are provided with lateral faces 13b which provide sliding engagement with the respective lateral walls 12a of the casing 12 and outer end faces 13c adapted to conform to the configuration of the curvate faces 12b of the casing 12 and also disposed at an angle equal to that of the surfaces 12b whereby upward movement of the clamping members within the casing 12 and with the surfaces 13c riding on the surfaces 12b, will afford spreading of the clamping members as shown in Figures 2, 3 and 5.

From the foregoing, it will be seen that movement of the bushings 13 upwardly within the casing 12 will allow a lateral movement thereof whereby disengagement of the internal threads of the bushings and the external threads 10a of the bolt 10 may occur. In assembling the nut upon the bolt it will thus be seen that by merely sliding the entire nut construction downwardly on the bolt, the above mentioned upward action of the bushings 13 within the casing 12 will occur and thus the internal threads thereof may be expanded laterally to disengage from the threads 10a of the bolt. Under these conditions, it will be seen that the nut, instead of being assembled upon the bolt by a rotative action, may be assembled thereon by sliding it down the body of the bolt until the work piece 11 has been reached whereupon the final turn of the nut, about a half turn, is utilized to provide a secure, locked engagement between the nut, the work piece and the bolt.

It will be readily understood that in constructions of the character described above, the bushings or inserts 13 if suitable provision is not made thereagainst, may fail to separate and thus the releasing action between the threads 10a of the bolt and those of the inserts or bushings will not occur. Under such circumstances, the workman must delay the assembling or removal operation long enough to disengage the threads of the bolt and inserts either by manually manipulating the inserts or by rattling the nut assembly about the bolt with the hope that the threads will accidentally become dislodged.

To the end that the above difficulty may be obviated and to the end that lateral spreading movement of the inserts will be assured, without attention from the workman, I have provided herein a construction which positively guides the bushings through a lateral outwardly spreading movement as they are moved upwardly within the casing 12 and also maintains the bushings and the casing against becoming separated during casual handling or storage in bins while affording the necessary relative movement between the parts to obtain the coaction desired. It will also be seen that the above end is attained with a minimum of additional structure and by means of cheap manufacturing procedures.

As will be clearly seen from Figures 3, 5 and 6, the bushings 13 are provided, on each of their faces 13b, with grooves 14 disposed substantially parallel to the inclined faces 12b of the casing member 12 and thus parallel to the upward and outward path taken by the bushings in their thread-releasing action. In order that the bushings may be retained inseparably with the casing 12, and so that the bushings or inserts 13 move only through the above described path, the latter is upset on its upper surface at two points along each of the walls 12a positioned in alignment with the upper ends of the grooves 14 when the bushings are in their lowermost position.

The upsetting operation above described provides lugs 15 which protrude into the grooves 14, the latter, as will be seen most clearly from Figures 5 and 6 having their ends terminating short of the upper and lower edges of the respective walls 13b.

It will also be understood that due to the angular disposition of the grooves 14, any upward movement of the bushings within the casing 12 will be accompanied by a positive lateral spreading movement of the bushings away from one another whereby disengagement of the threads of the bushings from the threads 10a of the bolt 10 will be positively insured.

While, of course, it is in the assembly of the nut construction with the bolt rather than the removal thereof wherein speed of the operation is most often required, it will be understood that the upward movement of the bushings 13 within the casing 12 may be also utilized in quickly removing the nut from the bolt. If the entire construction with which the nut and bolt assembly is associated is small enough, it may be reversed so that the bushings fall downwardly and thus spread when the nut has been unscrewed about half a turn from the work piece and then preliminarily raised back against that piece. Under such action the bushings become disengaged from the threads of the bolt and fall downwardly whereby they spread due to the coaction of the grooves 14 and the lugs 15. Thereafter the nut may be slid over the bolt.

If, however, the work piece is large and a reversal of the bolt is not possible, the nut may be unscrewed one turn or more turns and thereafter pressed against the work piece whereupon the bushings assume a raised and separated position within the shell or casing 12. The bushings may then be grasped and raised upwardly until the lower end of the grooves 14 engage the lugs 15 whereupon the bushings spread laterally to their fullest extent and the entire assembly may be raised upwardly on the bolt quickly and easily.

From the foregoing, it will be seen that I have provided herein a quick assembly nut construction wherein the bushings are permanently secured to the nut proper in their operative relationship to obviate the necessity for assembling the nut construction before it can be used as desired; wherein the construction provided insures positive spreading and disengagement of the bushings from the bolt as they are moved relative to the casing during the movement of the structure over the bolt and wherein the entire construction possesses the above attributes by virtue of a single set of simple cooperative elements formed incidentally to a cheap stamping or forging operation utilized to make the various parts of the construction.

What I claim is:

1. In a quick assembly nut construction, an outer shell member having an internal aperture therethrough, said aperture having substantially vertical opposed walls, opposed upwardly and outwardly tapered walls intermediate said vertical walls, a pair of bushing inserts each having side walls adapted to slidably engage said vertical walls, each having an outer end wall disposed at an angle similar to that of the adjacent tapered wall of the shell and each having an inner wall provided with interior threads, a groove in each of said side walls of each insert disposed parallel to the outer end wall thereof and terminating short of the lower edges of the respective walls and lugs upset from the upper edges of said vertical walls of said shell at points in alignment with the upper end of said grooves when said inserts are disposed in their innermost position relative to said shell.

2. In a quick assembly nut construction, a shell with an internal aperture bounded on two opposed sides by substantially vertical walls and on two intermediate opposed sides by outwardly and upwardly disposed walls, an insert assembly including a pair of insert bushings each having two opposed side walls adapted to slidably engage the vertical walls of the shell, an internally threaded inner wall and an outer wall disposed in parallelism to the respective outwardly and upwardly extending wall of the shell whereby the inserts may spread apart laterally when moved upwardly in the shell, means for positively urging said inserts apart to separate the internal threads thereof upon upward movement within the shell including grooves in the side walls of each insert disposed parallel to the outer wall of the respective inserts and terminating short of the lower edges of the respective side wall and lugs on said shell constructed and arranged to extend into each of said grooves.

3. In a quick assembly nut construction, a shell portion having a central aperture provided with opposed substantially vertical walls and separable inserts having opposed internally threaded faces housed in said aperture in the shell, said shell and said inserts having slidably engaging faces disposed to retain a flush engagement upon upward and outward movement of said inserts relative to said shell, grooves on the side of each of said inserts and disposed in parallelism to the outward and upward path of movement thereof and lugs upset from the edges of said shell constituting a junction between the upper surface thereof and said opposed substantially vertical walls of the aperture, said lugs being disposed at points aligned with the upper ends of said grooves when the inserts are in their lowermost and abutting positions in the shell.

4. In a quick assembly nut construction, an outer shell assembly having an internal aperture therethrough, said aperture having substantially vertical opposed walls, opposed upwardly and outwardly tapered walls intermediate said vertical walls, a pair of bushing inserts each having side walls adapted to slidably engage said vertical walls, each having an inner end wall provided with internal threads for cooperating with opposed sides of a bolt disposed therebetween and each having an outer wall disposed at an angle similar to that of the adjacent tapered wall of the shell, guiding means on said side walls of the inserts disposed substantially parallel to the surface of the outer wall thereof and means on the shell for cooperating with said guiding means to positively guide said inserts outwardly laterally apart from one another as they move upwardly relative to said shell.

5. In a quick assembly nut construction, an outer shell assembly having an internal aperture therethrough, said aperture having substantially vertical opposed walls, opposed upwardly and outwardly walls intermediate said vertical wall, a pair of bushing inserts each having side walls adapted to slidably engage the vertical wall, each having an inner end wall provided with internal threads for cooperating with opposed sides of a bolt disposed therebetween and each having an outer wall disposed at an angle similar to that of the adjacent tapered wall of the shell, guiding means on said side walls of the inserts and guiding means on the shell for cooperating with said first named guiding means, one of said guiding means being disposed substantially parallel to the surface of the outer wall of said inserts to positively guide said inserts outwardly laterally apart from one another as they move upwardly relative to said shell.

6. In a quick assembly nut construction for use with a bolt, a shell and separable inserts having opposed internally threaded faces adapted to cooperate with a bolt therebetween, said inserts being housed in said shell, said shell and said inserts having slidably engaging faces disposed to retain a flush engagement upon upward and outward movement of said inserts relative to said shell, guiding means on said inserts and guiding means on said shell for cooperating with said first named guiding means, one of said guiding means being disposed substantially obliquely relative to the longitudinal axis of a bolt engaged by said internally threaded faces to positively guide said inserts outwardly laterally apart from one another as they move upward relative to said shell.

LAYTON C. KINNEY.